July 26, 1949.  J. A. L. PIETERS  2,477,390
CONTINUOUSLY OPERATING FURNACE
FOR THE DISTILLATION OF FUEL
Filed Aug. 9, 1945  3 Sheets-Sheet 3
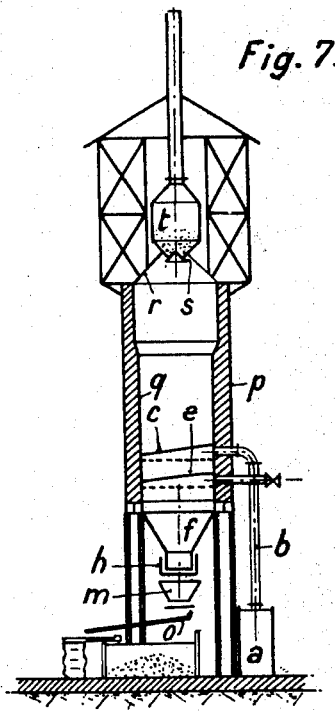
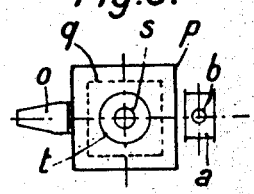
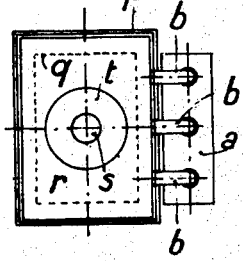
Inventor
Julien Pieters
By Stewart Downing Lee & Co
Attys Patented July 26, 1949

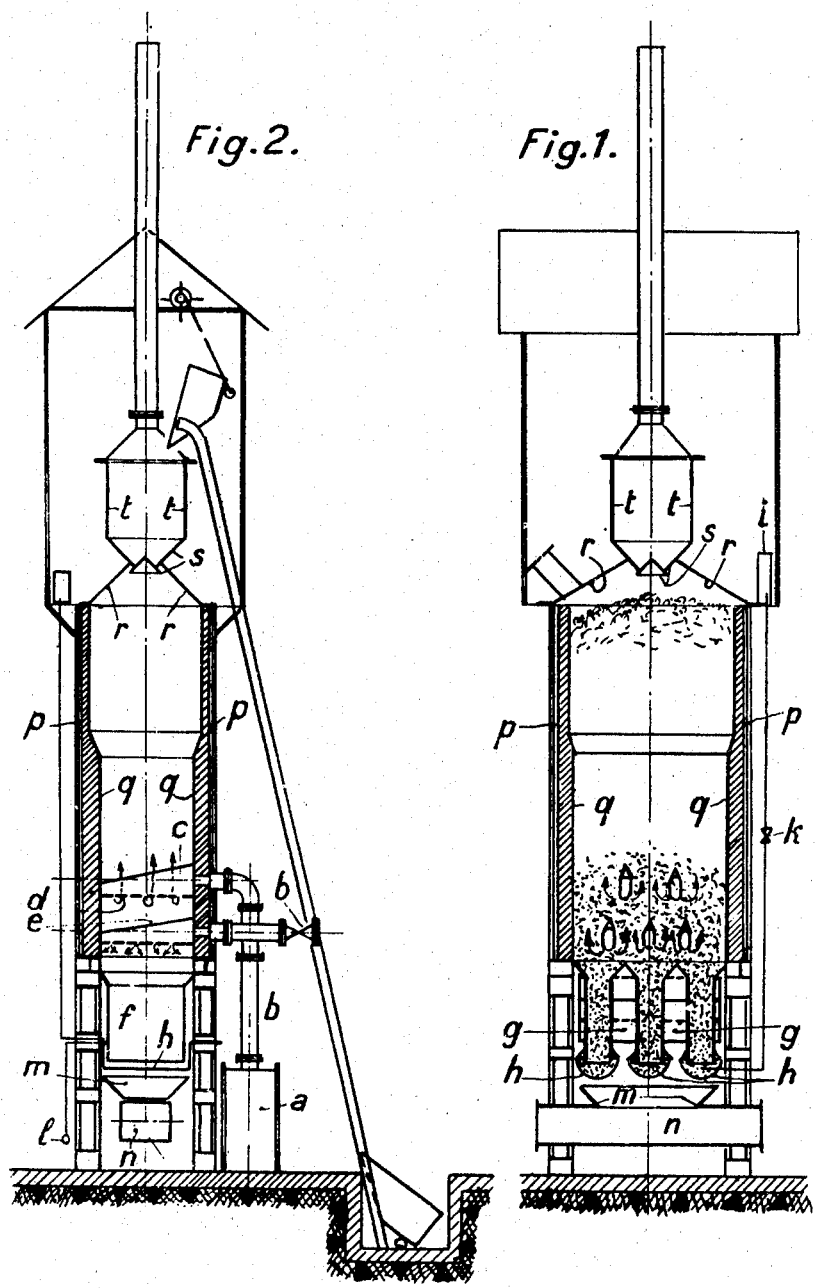

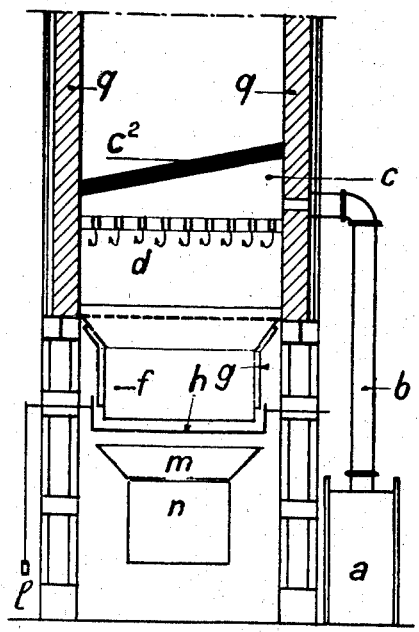
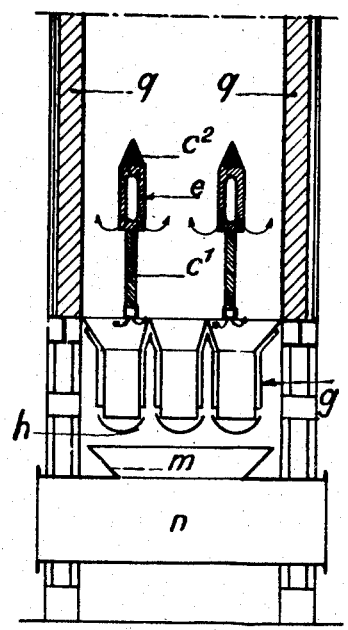
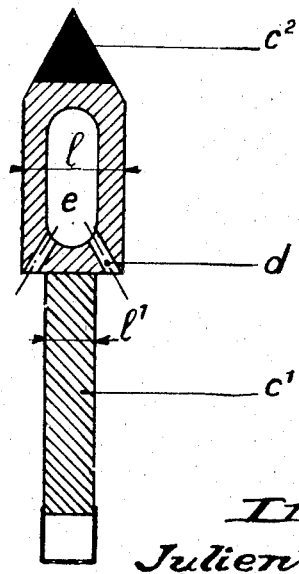

2,477,390

UNITED STATES PATENT OFFICE 2,477,390

CONTINUOUSLY OPERATING FURNACE FOR THE DISTILLATION OF FUEL

Julien Arthur Léon Pieters, Paris, France

Application August 9, 1945, Serial No. 609,871
In France September 11, 1940

Section 1, Public Law 690, August 8, 1946
Patent expires September 11, 1960

10 Claims. (Cl. 202—121)

My invention has for its object a continuously operating furnace, for the distillation of fuel of any description such as coal, brown coal, peat, wood, vegetable and forest waste, bituminous shale and the like, the heating being performed by internal direct contact.

My invention has also for its object the internal heating of the continuous furnace for the distillation of any kind of fuel.

According to my invention the furnace has the distributing channels built of refractory bricks so as to increase the resistance of these distributing channels both to the action of the high temperature prevailing in the furnace and to the mechanical stresses exerted by the coke or coal produced. Moreover each distributing channel is carried by a wall inserted in the furnace and is capped by a protective cover having the shape of a metal wedge for instance.

The uniform sinking of the material throughout the cross section of the furnace is obtained by means of rocking dampers, the length of which is very near that of the furnace or equal thereto and the number of which is sufficient, so that all the particles undergoing distillation have substantially the same length to travel over, between the inlet at the upper part and their outlet at the lower end.

These rocking dampers of cylindrical shape, the concavity of which is directed upwardly are partly filled with water so as to constitute an hydraulic perfectly fluidtight protection at the outlet of the furnace. The instantaneous filling of the hydraulic protection in these dampers is obtained, by means of a small raised tank, the capacity of which corresponds to the amount of water required for each filling, after each of the partial emptyings of the furnace, which are performed at more or less regular spaced intervals. As stated hereabove, the recuperation of the last calories remaining in the distilled residue, after the passage of the cold recuperating gas, is obtained by means of the air used for heating, flowing around the metallic extinguishers forming the lower part of the furnace.

The coal, coke or semicoke, or residue, is thus completely cooled before it comes out of the furnace.

I have shown in the accompanying drawings, by way of example, different forms of a continuously operating distillation furnace embodying my invention.

Fig. 1 is a vertical cross-sectional view through the axis of the distillation furnace, perpendicularly to the channels distributing the hot smokes.

Fig. 2 is a vertical cross-sectional view perpendicular to the plane of Fig. 1.

Figs. 3 and 4 are two diagrammatic cross-sections of part of the furnace through two planes perpendicular to one another and showing the particular arrangement of the distributing channels.

Fig. 5 is a cross-section at a larger scale of a distributing channel according to my invention.

Fig. 6 is a horizontal view of the distillation furnace together with its auxiliary parts in a complete plant.

Figs. 7 and 8 show a furnace adapted for the treatment of compressed or agglomerated fuel.

In all above figures, the same parts are designated by the same reference numbers.

Returning to Figs. 1 and 2, the heating firebox $a$ inside which is burnt a part of the distillation gases is quite near the furnace so as to produce the hot smokes required for the distillation.

Inside this firebox is introduced a certain amount of steam to produce the desulphurization of the sulphur-containing fuel, as disclosed hereinabove. This steam is thus brought to a temperature of 900 to 1200° C. which is equal to that prevailing in the firebox.

These hot smokes rise inside the pipes $b$ lined inwardly with refractory material so as to protect the sheet iron casing against the high temperature and to avoid at the same time any loss of heat.

The pipes $b$ lead directly into the distribution channels $c$.

The latter have a cross-section which decreases in the direction of the flow in order to keep their speed and consequently their pressure constant.

They are provided in their lower portion, with calibrated holes $d$, arranged in the same horizontal plane and through which the hot smoke streamlets escape.

These horizontal channels $c$, made of refractory cast iron are moreover provided with an inner lining of still higher refractory power in order to resist in a still more complete manner the action of heat.

The hot smokes, as soon as they pass out of said calibrated holes $d$ mix with the cold recuperation gases, blown in through the horizontal channels $e$.

The latter are identical with the channels $c$, but do not show any inner refractory lining. They are arranged at a suitable distance underneath the level of the channels $c$ so that these cold gases, passing through the already distilled product may recover all the free heat contained in the latter before mixing with the hot smokes.

The cold gases blown into the lower channels $e$ are preferably combustible gases coming from the furnace. They have a double object: that on one hand of recovering the free heat contained in the residue and on the other hand of reducing, to a considerable extent if required, the temperature of the hot smokes blown into the furnace at a higher level so as to form a mean gas the temperature of which is only slightly higher than that of the distilled product, and to obtain thereby the ideal conditions for distillation at low temperature.

The result thereof is a considerable economy in the heating, not only by reason of the heat recovered in the residue, but also by reason of the high efficiency of the hearth, due to the high temperature of the combustion smokes, which it is possible to blow directly into the furnace, while a slow and progressive distillation at low temperature is actually obtained in practice.

The proportion of hot smoke and cold recuperation gases blown into the furnace may vary inside limits as wide as possible, through the adjustment of the cocks inserted in the gas admission pipes.

After its free heat has been recovered, the residue passes into the recuperating extinguishers $f$ where its temperature is lowered down to a limit near the exterior temperature, under the action of a draught passing through the channels $g$ arranged on the outside of these extinguishers. The hot air of these recuperators is used for the combustion of the gas inside the firebox $a$.

Thus, the totality of the heat contained in the residue is recovered in a perfect manner and is transferred into the furnace in order to reduce the heat required for distillation.

The residue of the distillation, once entirely cooled, rests on the cylinder-shaped dampers $h$ the concavity of which is directed upwardly so as to form actually receivers, which it is sufficient to fill partly with water in order to form a fluid-tight hydraulic protection. A very small amount of water is sufficient therefore because the pressure or depression prevailing at this point of the furnace can only reach a few millimeters of water.

For a very rapid filling of this protective hydraulic joint without any excess water, I use a small raised water tank $i$ the contents of which is equal to the amount of water deemed necessary, said amount of water being allowed to flow down rapidly as soon as the cock $k$ has been opened.

The number of extinguishing compartments $f$ and their length, equal to that of the dampers used for emptying the furnace, are such that all the particles of material contained in the furnace are constrained to follow paths which are substantially equivalent between the inlet and the outlet of the furnace.

This provides for a regular movement of the material, at each partial removal, and consequently an absolutely identical heating-process for all the particles undergoing distillation.

The removal of the exhausted material is performed, at comparatively long regularly spaced intervals, by turning the dampers $h$ with the levers $l$, so as to uncover completely the lower opening of the extinguishers.

The material falls then suddenly into a hopper $m$, out of which it is removed by means of a conveyor $n$ or by any other suitable means.

The material may be received directly from the hopper $m$ by a sieve $o$ (Fig. 7) which allows a classification of the product together with the removal of the dust, if required.

The distillation furnace is constituted by a mere vertical sheet iron shaft $p$ inwardly lined with refractory bricks $q$, the height of which is calculated according to the time necessary for heating the material.

The shaft is closed at its upper end by a cover $r$ provided with tight closing means so as the well known "cup and cone" system.

A hopper $t$ of predetermined capacity arranged at the upper end of the shaft provides for the rapid filling of the furnace with a quantity of material corresponding to the volume of distilled material removed at the lower end of the furnace.

The hopper itself is fed by means of a bucket chain, or a skip, or the like suitable known means.

The distillation gases, mixed with the smokes and the blown-in gases, flow out at the upper end of the furnace to be treated in by-product plant, in accordance with known processes. Part of these gases, after purification, washing, and removal of the by-products, is blown into the firebox $a$.

Another part of the cold purified gases is blown through the channels $e$ directly in the furnace.

The last portion of the gas, corresponding to the excess of heat, is removed from the circuit in order to be used for the production of driving power or for any other purposes.

In the preferred form of execution, as illustrated in Figs. 3 to 5, the distributing channels $c$ are executed entirely by means of refractory bricks such as bricks of alumina or of Carborundum or of a mixture of aluminous earth and Carborundum.

Each distributing channel is carried by a wall $c^1$ also made of refractory bricks; this wall $c^1$ bears on a lower beam, or on the two opposite walls of the distillation chamber of the furnace, and is bounded at its base by the air-heating channels $g$ (Figs. 3 and 4). Through the lower part of the support, cold gases are adapted to flow, before they are blown into the furnace, in order to prevent any superheating.

The width $l^1$ of this supporting wall (Fig. 5) is less than the width $l$ of the distributing channel $c$ and consequently it is easy to provide the holes $d$, out of which the burnt gases flow into the distillation chamber, at the very bottom of the distributing channel $c$, these holes being uncovered by the wall $c^1$.

Each distributing channel $c$ carries a protecting cap $c^2$ constituted for instance by a metallic wedge-shaped part the apex of which is directed upwardly.

This improved furnace shows numerous advantages and chiefly the following:

(a) The distributing channels being entirely constituted by refractory bricks, resist in an efficient manner the high temperatures of the heating smokes and of the furnace without any deformation.

(b) Each distributing channel is however held in an efficient manner by the wall $c^1$ arranged underneath this distributing channel. The wall may be carried in its turn by a hollow metallic beam inside which flow the cold gases injected into the furnace.

(c) The calibrated holes $d$ for the outlet of the burnt gases are provided in the very bottom of the distributing channel $c$ and are protected at the same time by the wall $c^1$. They are thus located under the best conditions for allowing an easy escape of the burnt gases and avoiding any obstruction through the more or less pulverulent material contained in the distillation furnace.

(d) The protecting cap $c^2$ which has a sloping shape, allows the free sliding of the coke produced by the distillation of the coal and avoids thus the formation of an exaggerated pressure on the distributing channels, which prevents any deformation of these channels.

When it is desired to distil, in accordance with this process, bituminous, agglomerated, or compressed material, i. e. material which may be softened or become deformed during the heating, such fuel should at the moment of loading be embedded in calibrated dust having no agglutinating power and constituted preferably by dust of charcoal, or of coke or semi-coke produced from wood, lignite or coal. This embedding may be performed as follows in the most easy manner.

The raw agglomerated material, i. e. the bituminous coal, is loaded in a skip not filling it entirely. It is added dust at its upper part so to finish filling the said skip. During the movement of this skip and during its emptying into the loading hopper, and then into the furnace, the dust filters into all the interstices left inside the agglomerated material which is thus perfectly embedded.

At the outlet of the furnace, the screen o allows a direct elimination of this dust, after which it is calibrated again and the fine dust is removed, this fine dust being constituted by fine particles from nought to 3 mm.

This fine dust is recycled for the preparation of agglomerated fuel and the calibrated dust serves again for embedding purposes.

In the case of sulphurous coal, the raw agglomerated fuel contains a predetermined proportion of an alkaline salt which combines with the sulphur during the distillation at high temperature. This salt, either dry or dissolved in water is mixed into the paste before its agglomeration.

What I claim is:

1. A continuous operating vertical furnace for distilling peat, wood, vegetable and forest waste, bituminous shale and other combustible material, comprising a vertical shaft, means for feeding said shaft at its top with the material to be treated, a firebox distinct from said shaft, a pipe connecting said firebox to said shaft, a first series of horizontal channels inside said shaft, arranged parallel to two opposite walls of said shaft, by means of which the hot smokes rising from said firebox through said pipe are regularly distributed in the upper part of the shaft forming the distillation zone, said channels being provided at their lower part with outlet calibrated holes, a second series of horizontal channels inside said shaft, arranged parallel to same walls and underneath the first series at a certain distance from the latter, for distributing regularly cold combustible gases recovered from the furnace, so as to mix together hot smokes and cold gases, said channels of both series having a gradually decreasing cross-section in the direction of flow of said gases and smokes, and means for discharging the exhausted material at the bottom of the furnace.

2. A furnace according to claim 1 wherein the channels of the first series are entirely formed with refractory material.

3. A furnace according to claim 1 wherein the channels of the first series are inwardly lined with refractory material.

4. A furnace according to claim 1 wherein said channels of the first series are supported by means of a wall inserted in the furnace.

5. A furnace according to claim 1 wherein said channels of the first series are supported by means of a wall inserted in the furnace, a hollow metal beam carrying said wall.

6. A furnace according to claim 1 wherein said channels of the first series are supported by means of a wall inserted in the furnace, the width of said wall being smaller than that of the channel carried thereby.

7. A furnace according to claim 1 wherein said channels of the first series are supported by means of a wall inserted in the furnace, the width of said wall being smaller than that of the channel carried thereby, said channels being provided at their lower part with calibrated holes to either side of the supporting wall.

8. A furnace according to claim 1 wherein each channel of the first series is provided with a protective cap.

9. A furnace according to claim 1 wherein each channel of the first series is provided with a protective cap formed by a metallic wedge-shape part the tip of which is directed upwardly.

10. A furnace according to claim 1 which is provided at its lower part with a plurality of separate flame extinguishing compartments, means for circulating air round said compartments a series of semi-cylindrical dampers each of which is located underneath each compartment so as to be partly filled with a mass of water, and means for rotating said dampers about a longitudinal horizontal axis, the underside of said compartments being entirely uncovered by such a rotation, a higher water containing capacity and means whereby said capacity is adapted to communicate with the inside of said dampers.

JULIEN ARTHUR LÉON PIETERS.

REFERENCES CITED

The following references are of record in the file of this patent:

UNITED STATES PATENTS

| Number | Name | Date |
|---|---|---|
| 978,236 | Tobelmann | Dec. 13, 1910 |
| 1,308,574 | Graul | July 8, 1919 |
| 1,319,917 | Wilcox | Oct. 28, 1919 |
| 1,357,278 | Day | Nov. 2, 1920 |
| 1,560,311 | Pieters | Nov. 3, 1925 |
| 1,591,729 | Trent | July 6, 1926 |
| 1,603,793 | Otto | Oct. 19, 1926 |
| 1,669,024 | Runge | May 8, 1928 |
| 1,690,935 | Hubmann | Nov. 6, 1928 |
| 1,785,645 | Odell | Dec. 16, 1930 |
| 1,838,622 | Herrick | Dec. 29, 1931 |
| 1,845,221 | Becker | Feb. 16, 1932 |
| 1,939,457 | Merkel | Dec. 12, 1933 |
| 2,026,923 | Warner | Jan. 7, 1936 |
| 2,312,865 | Bird | Mar. 2, 1943 |